United States Patent [19]

Kato et al.

[11] Patent Number: 4,598,684
[45] Date of Patent: Jul. 8, 1986

[54] APPARATUS FOR CONTROLLING AIR/FUEL RATIO FOR INTERNAL COMBUSTION ENGINE

[75] Inventors: Katsushi Kato, Kariya; Toshiaki Mizuno, Nagoya, both of Japan

[73] Assignee: Nippondenso Co., Ltd., Kariya, Japan

[21] Appl. No.: 746,789

[22] Filed: Jun. 20, 1985

[30] Foreign Application Priority Data

Jun. 22, 1984 [JP] Japan .................. 59-129566

[51] Int. Cl.$^4$ ...................... F02M 51/00; F02M 25/06
[52] U.S. Cl. ...................... 123/478; 123/489; 123/571
[58] Field of Search ............... 123/440, 478, 480, 489, 123/568, 569, 571; 364/431.06

[56] References Cited

U.S. PATENT DOCUMENTS

| 4,461,263 | 7/1984 | Hasegawa | 123/489 X |
| 4,488,533 | 12/1984 | Sekiguchi et al. | 123/569 |
| 4,553,518 | 11/1985 | Takao et al. | 123/478 |

FOREIGN PATENT DOCUMENTS

| 0027130 | 4/1973 | Japan . |
| 0044760 | 3/1982 | Japan . |
| 0083641 | 5/1982 | Japan . |

Primary Examiner—W. R. Wolfe
Attorney, Agent, or Firm—Cushman, Darby & Cushman

[57] ABSTRACT

In an internal combustion engine equipped with exhaust gas recirculation system, air/fuel ratio control is effected using various engine parameters including atmospheric pressure. To this end, basic fuel injection duration is first computed, and this basic fuel injection duration is corrected using a correction factor so that a desired air/fuel ratio is obtained irrespective of the change in atmospheric pressure. When EGR is performed a first correction factor is derived or calculated using engine speed data, intake pressure data and atmospheric pressure data. When EGR is not performed, a second correction factor is derived or calculated using atmospheric pressure data. When obtaining the first correction factor, interpolation is used to obtain the value thereof suitable for detected engine speed, intake pressure and atmospheric pressure.

6 Claims, 5 Drawing Figures

APPARATUS FOR CONTROLLING AIR/FUEL RATIO FOR INTERNAL COMBUSTION ENGINE

BACKGROUND OF THE INVENTION

The present application is related to the co-pending, commonly assigned, application of Katsuhiko Kodama et al, Ser. No. 729,145, filed on Apr. 30, 1985.

This invention relates generally to air/fuel ratio control of an internal combustion engine equipped with exhaust gas recirculation system, and more specifically to apparatus for controlling air/fuel ratio to provide a desired air/fuel ratio irrespective of the change in atmospheric pressure.

Exhaust gas recirculation, which is known as EGR, is used for reducing the concentration of nitrogen oxides (NOx) included in exhaust gasses from an internal combustion engine. In an internal combustion engine equipped with such an EGR system, it has been a difficult problem to effect accurate air/fuel ratio control since the amount of fresh air taken into the engine cylinders cannot be directly detected in so called speed-density system. This is caused from the fact that the intake gas introduced into engine cylinders includes both fresh air and recirculated burnt gasses in an engine with EGR system.

One approach of providing accurate air/fuel ratio control is to correct air/fuel ratio using the intake pressure and rotational speed of the engine as variables as disclosed in a Japanese patent provisional publication No. 48-27130.

However, this prior art technique suffers from a problem that air/fuel ratio is undesirably changed when atmospheric pressure varies. This is because the change in atmospheric pressure results in the change in back pressure and thus, the concentration of air or oxygen of the intake air varies even though intake pressure detected by an intake pressure sensor exhibits the same value. In speed-density system, since the quantity of intake air is estimated using only intake pressure, necessary correction of air/fuel ratio for compensating for the change in air and oxygen concentration due to the change in back pressure cannot be made, and therefore air/fuel ratio is apt to deviate from a desired value.

SUMMARY OF THE INVENTION

The present invention has been developed in order to remove the above-described drawbacks inherent to the conventional EGR systems.

It is, therefore, an object of the present invention to provide a new and useful apparatus for controlling air/fuel ratio for an internal combustion engine so that a desired air/fuel ratio is obtained irrespective of the change in atmospheric pressure while EGR operation is not affected by the change in atmospheric pressure.

In order to achieve the above object, basic fuel injection duration is corrected using a correction factor so that a desired air/fuel ratio is obtained irrespective of the change in atmospheric pressure. When EGR is performed a first correction factor is derived or calculated using engine speed data, intake pressure data and atmospheric pressure data. When EGR is not performed, a second correction factor is drived or calculated using atmospheric pressure data. When obtaining the first correction factor, interpolation is used to obtain the value thereof suitable for detected engine speed, intake pressure and atmospheric pressure.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
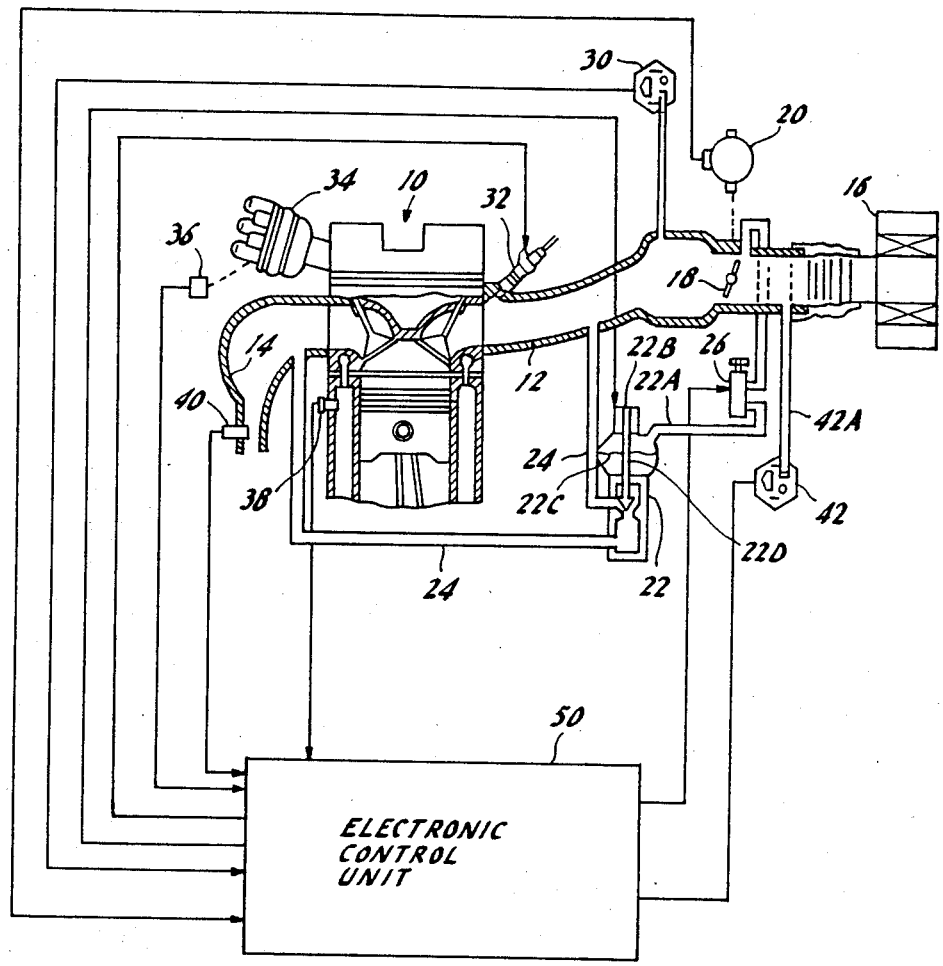
FIG. 1 is a schematic view of an internal combustion engine equipped with EGR system and air/fuel ratio control apparatus according to the present invention.

Referring now to FIG. 1, a schematic view of an internal combustion engine equipped with EGR system according to the present invention is shown. An internal combustion engine 10 is equipped with an intake pipe 12 and an exhaust pipe 14, and the operating state of the engine 10 is detected by various sensors all the time. An electronic control unit 50 controls the internal combustion engine 10 using detection results from the various sensors as will be described in detail hereinlater.

The intake pipe 12 is provided for supplying the engine 10 with fresh air and recirculated exhausted gasses. To one end of the intake pipe 12 is attached an air filter 16 for cleaning intake air, and a throttle valve 18 is provided within the intake pipe 12 for contolling the intake fresh air quantity. The throttle valve 18 is associated with a throttle opening degree sensor 20 supplying the electronic control unit 50 with throttle opening degree information.

The exhaust gas recirculation from the exhaust pipe 14 to the intake pipe 12 is carried out via an EGR tube 24 in which an EGR control device 22 is provided. The EGR control device 22 comprises a control valve of diaphragm type and is arranged such that a diaphragm 22C thereof drives a control valve 22D having a valve head against a force of cylindrical spring in accordance with pressure fed via a control conduit 22A so that the amount of exhaust gasses flowing through the EGR tube 24 is controlled. Thus the control valve 22D moves up and down in the drawing, where the reciprocal movement of the control valve 22D is detected by an EGR valve lift sensor 22B built in the EGR control device 22. The EGR valve lift sensor 22B is of linear solenoid type producing an output signal indicative of the position of the control valve 22D. The control conduit 22A communicates via an electromagnetic valve 26 with the intake pipe 12 at a portion slightly upstream the throttle valve 18. The portion upstream the throttle valve 18 where the conduit 22A is connected exhibits a pressure substantially the same as atmospheric pressure.

With this arrangement, when the electromagnetic valve 26 is energized to open, pressure substantially equal to atmospheric pressue is sent via the valve 26 to the control conduit 22A. As a result, the diaphragm 22C is lowered by the force of the cylindrical spring causing the valve head of the control valve 22D to be in contact with an associated valve seat closing the EGR tube 24. Therefore, exhaust gasses are prevented from being recirculated. On the other hand, when the electromagnetic valve 26 is deenergized to be closed and when the opening degree of the throttle valve 18 is greater than a predetermined value, negative pressure is led into the conduit 22A to cause the diaphragm 22C to move upwardly against the force of the cylindrical spring. As a result, the valve head of the control valve 22D is lifted up allowing exhaust gas recirculation via the EGR tube 24.

An intake pressure sensor 30 is provided to detect the negative pressure at a portion downstream the throttle valve 18 thereby detecting the pressure of fresh air and recirculated exhaust gasses within the intake pipe 12. An output signal from the intake pressure sensor 30 is fed to the electronic control unit 50. The reference 32 is a fuel injection valve through which fuel is sprayed into air taken into each cylinder of the engine 10. The reference 34 is a distributor of an ignition system of the engine 10, and the reference 36 is a rotational angle sensor associated with the distributor 34 for detecting the rotational speed of the engine crankshaft. The reference 38 is a coolant temperature sensor for detecting the temperature of engine coolant, and the reference 40 is an oxygen sensor for detecting the concentration of oxygen within the exhaust gasses in the exhaust pipe 14. The reference 42 is an atmospheric pressure sensor for detecting atmospheric pressure from a conduit 42A communicating with the intake pipe 12 at a portion between the throttle valve 18 and the air cleaner 16.

Figure 2:
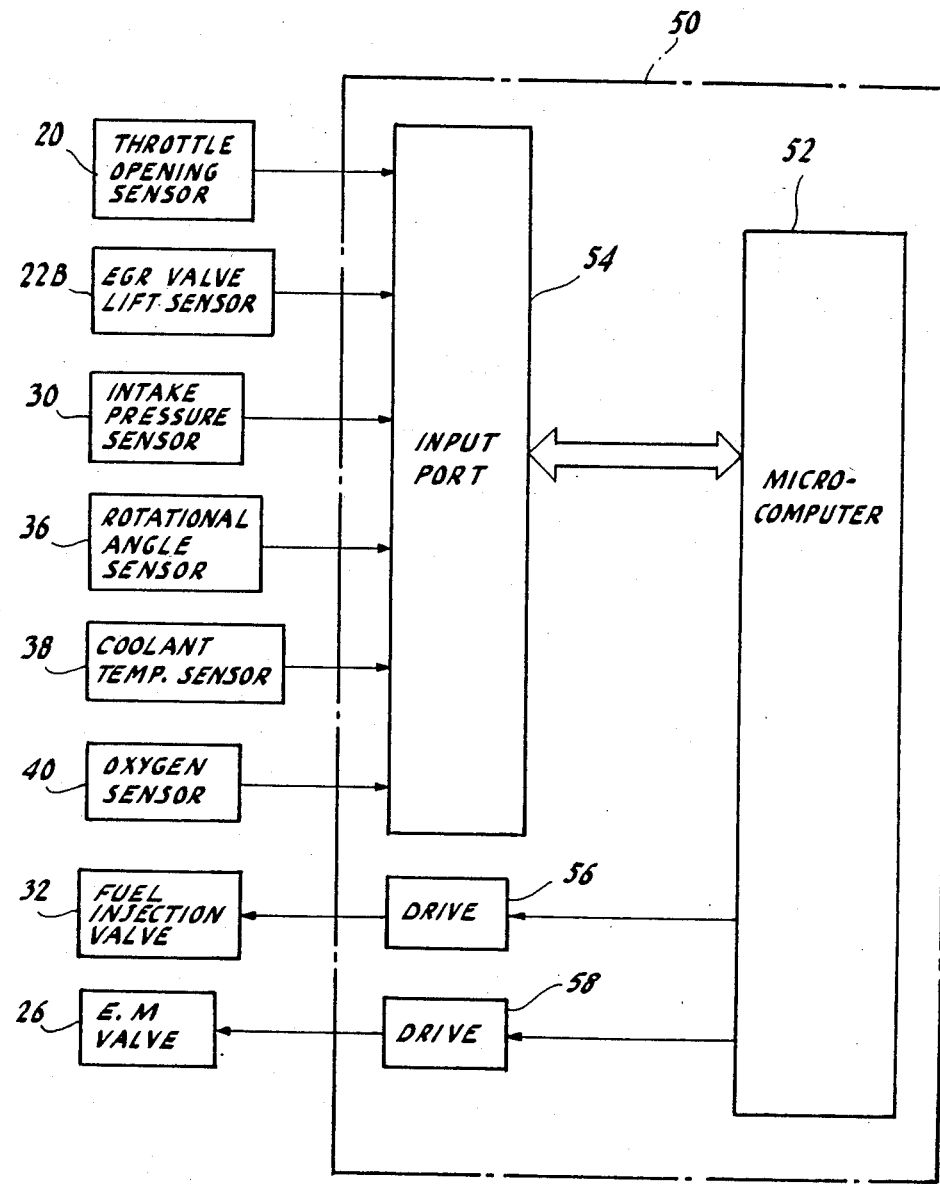
FIG. 2 is a block diagram of an electronic control unit used in the apparatus of FIG. 1.

FIG. 2 is a block diagram of an electrical system associated with the EGR system and the air/fuel control apparatus according to the present invention. The electronic control unit 50 comprises a microcomputer 52, an input processing portion 54 including an A/D converter (not shown), and two drive circuits 56 and 58. The input processing portion 54 also comprises buffers and waveform shaping circuits so as to receive various signals from the sensors 20, 22B, 30, 36, 38 and 40 and send corresponding information in the form of digital signals to the microcomputer 52 having memories (not shown). The microcomputer 52 is arranged to operate in accordance with a program stored in its memory using various information from the above-mentioned sensors so as to output instruction signals to the drive circuits 56 and 58 by which the engine 10 is optimally controlled. More specifically, the fuel injection valve 32 is controlled to inject a desired amount of fuel to obtain desired air/fuel ratio, while the electromagnetic valve 26 is controlled to adjust the amount of recirculated exhaust gasses.

Figure 3:
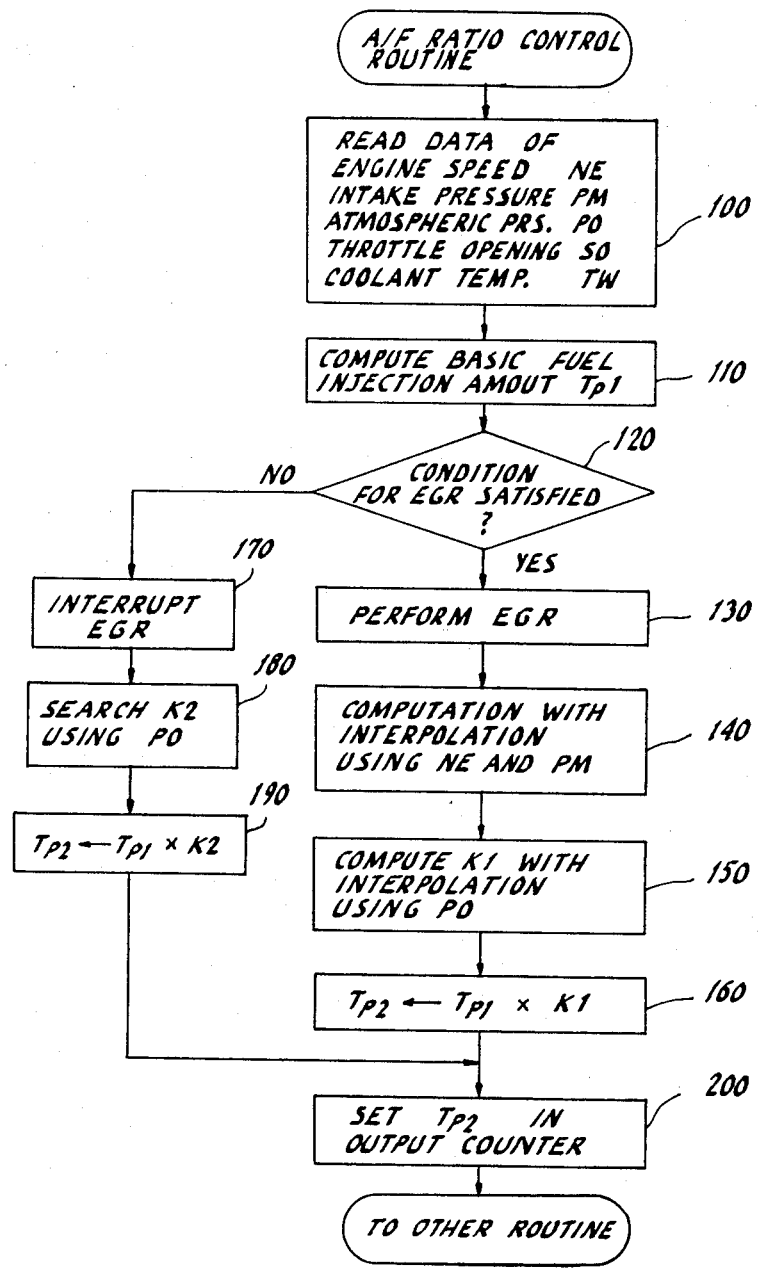
FIG. 3 is a flowchart showing an operational program of a microcomputer used in the electronic control unit of FIG. 2.

FIG. 3 is a flowchart showing an air/fuel ratio control routine among various control routines. With this routine a valve-opening duration Tp of the fuel injection valve 32, which defines the amount of fuel supplied to the engine 10 is computed. Since this routine should be carried out frequently in accordance with the operating state of the engine, this routine is arranged to be executed at an interval corresponding to a given number of rotations of the engine 10 or at a given interval using a timer built in the microcomputer 52. The air/fuel ratio control routine will be described in detail hereinafter.

When the air/fuel ratio control routine of FIG. 3 is started, a step 100 is executed for reading outputs from the intake pipe pressure sensor 30, the rotational angle sensor 36, the atmospheric pressure sensor 42, the throttle opending degree sensor 20, and the coolant temperature sensor 38 so as to detect intake pipe pressure PM, rotational speed NE of the engine 10, atmospheric pressure PO, throttle valve opening degree SO and coolant temperature TW.

In a subsequent step 110, an optimum amount Tp1 of fuel to be supplied to the engine 10 is calculated in the form of a basic fuel injection duration Tp1 of the fuel injection valve 32 using the above two detected data PM and NE. To calculate Tp1, actual computation using a formula including the data PM and NE may be operated or a two-dimentional map may be used so that a corresponding Tp1 is picked up from the map prepared in advance by storing data in the memory using PM and NE as two variables. The value of this Tp1 is determined under an assumption that all the intake gas sucked into the engine cylinders is fresh air taken from the outside of the engine.

In the air/fuel ratio feedback control, the engine 10 is operated with a specific mixing ratio between fuel and oxygen, which mixing ratio is selected through overall decision relating to fuel consumption, engine output, harmful components emission or the like in a steady operating state after the engine 10 is warmed up. The air/fuel mixing ratio is detected using the oxygen sensor 40.

The oxygen sensor 40 is arranged to output a lean signal when air/fuel ratio is higher than a desired value, i.e. when amount of fuel is less, and a rich signal when air/fuel ratio is lower than the desired value, through contiuous detection of oxygen concentration in exhaust gasses in the exhaust pipe 14. The electronic control unit 50 receiving the output from the oxygen sensor 40 performs feedback control so as to maintain the above-mentioned specific air/fuel ratio all the time by lengthening the basic fuel injection duration Tp when the lean signal is present and by shortening the same when the rich signal is present. Since air/fuel ratio control using oxygen concentration in the exhaust gasses is well known in the art, a detailed description of such known control is omitted.

In a step 120, it is checked whether all the conditions necessary for performing EGR are satisfied or not. More specifically, these conditions for EGR include that the rotational speed NE of the engine 10 is smaller than a predetermined value NEo, that the detected temperature of the coolant from the coolant temperature sensor 38 is higher than a predetermined temperature TWo, and that the output from the throttle valve opending degree sensor 20 indicates that the opening degree is greater than a predetermined value so that the engine is other than an idle state. Namely, only when the engine is in normal operating state after being warmed up, it is determined that conditions for EGR are satisfied. If even one of these conditions is not satisfied, then a step 170 is executed to interrupt EGR.

Assuming that all the above-mentioned conditions are satisfied, a step 130 is executed to carry out EGR. To start EGR operation, a control signal is fed from the microcomputer 52 to the drive circuit 56 to disable the electromagnetic valve 26. As a result, negative pressure in the intake pipe 12 is led into the conduit 22A, and thus the control valve 22D of the EGR control device 22 is raised to perform EGR. EGR is performed with the amount of exhaust gasses to be recirculated being determined as is well known in the art. The exhaust gas recirculation amount may be a value which corresponds to the output from the EGR valve lift sensor 22B, and represents an opening degree of the control valve 22D of the EGR control device 22 which is necessary for recirculating an optimum amount of exhaust gasses using the two variables PM and NE.

Steps 140, 150 and 160 which follow the step 130 of EGR, are provided for correcting the amount of fuel to be injected so as to compensate for air/fuel ratio which is undesirably changed by the performance of EGR. More specifically, since the introduction of exhaust gasses into engine cylinders results in less ratio of oxygen, the amount of fuel to be injected has to be reduced to maintain a desired air/fuel ratio when EGR is started. The way of air/fuel ratio correction will be described in detail hereinafter.

A correction factor K1 is computed through the steps 140 and 150, where the correction factor K1 is factor to be used for reducing the basic fuel injection duration Tp1 for compensating for the air/fuel ratio, which is undesirably changed due to the performance of EGR, so as to maintain a desired air/fuel ratio irrespective of the performance of EGR. More specifically, since burnt gasses are introduced into engine cylinders together with fresh air with the performance of EGR, the concentration of oxygen is reduced. Therefore, if the fuel were injected for the basic fuel injection duration Tp1, the air/fuel ratio would be higher than a desired value, resulting in rich mixture. In order to avoid the application of such a rich mixture during EGR operation, therefore, the basic fuel injection duration Tp1 is shortened by a ratio equal to the correction factor K1, which is 1 or less. This correction factor K1 also represents the amount of exhaust gasses in the gasses sucked into the engine during EGR operation, and therefore, the value of the correction factor K1 has to be changed in accordance with the rotational speed of the engine 10, the intake pressure and the atmospheric pressure.

In order to accurately determine the value of the correction factor K1 having complex relationship with the engine speed, intake pressure and atmospheric pressure, the present invention uses a specific way of computation involving interpolation. To this end, two sorts of maps of a plurality of values of a correction factor K (which is different from the above-mentioned K1) are provided in advance in the memory of the microcomputer 42. These two maps are respectively provided for a predetermined low pressure PL and a predetermined high pressure PH, and are designated respectively at ML and MH. Here, the words "high pressure" are used to mean atmospheric pressure at a low altitude, while the words "low pressure" are used to mean atmospheric pressure at a high altitude.

Figure 4A:
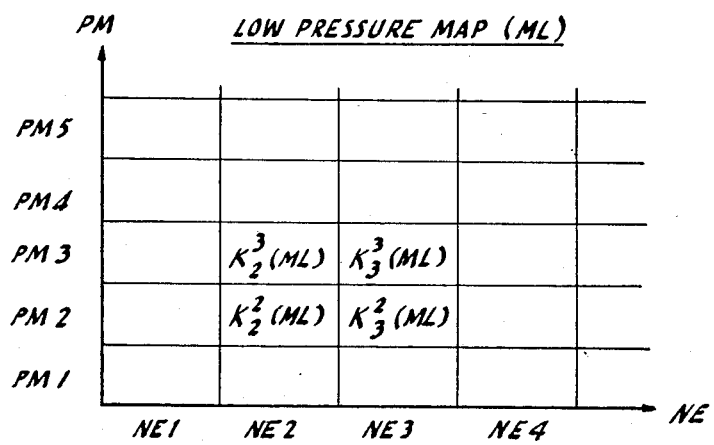
FIGS. 4A and 4B are exmplanatory diagrams showing the maps used in the operation of the flowchart of FIG. 3.
Figure 4B:
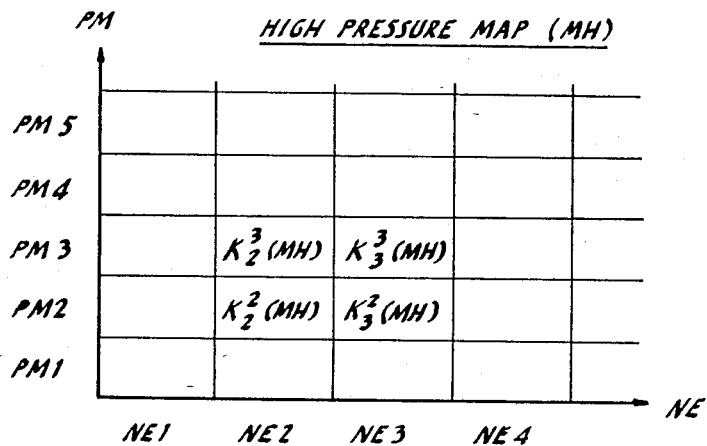

FIGS. 4A and 4B respectively show examples of the low pressure map ML and MH. Each of these maps ML and MH are arranged in the form of two-dimentional table using engine speed values NE and intake pressure values PM as parameters. Since detected engine speed NE and detected intake pressure PM do not usually accurately equal one of the engine speed values NE and intake pressure values PM of these maps ML and MH, interpolation is effected to obtain an accurate correction factor. Suppose the detected engine speed NE is between NE2 and NE3, i.e. NE2<NE<NE3, and the detected intake pressure PM is between PM2 and PM3, i.e. PM2<PM<PM3. In such a case, interpolation is effected in conection with PM or NE first and then in connection with the other. For instance, correction factors $K_2{}^3$ and $K_3{}^3$ are used first to obtain, through interpolation, a correction factor suitable for detected engine speed NE in conection with PM3, and then $K_2{}^2$ and $K_3{}^2$ are used to obtain through interpolation another correction factor suitable for the detected engine speed NE in connection with PM2. After this, these two correction factors are used to obtain, through interpolation, a correction factor suitable for detected intake pressure PM. The above-mentioned operation is executed in connection with both the low pressure map ML and the high pressure map MH to obtain two correction factors K(ML) and K(MH) which are suitable for detected engine speed NE and detected intake pressure PM. However, these correction factors K(ML) and K(MH) cannot be used directly since these correction factors are suitable for the predetermined low atmospheric pressure PL and the predetermined high atmospheric pressure PH respectively.

In a following step 150, the correction factor K1 is obtained as follows through further interpolation. In detail, the value of the correction factor K1 is computed using the correction factors K(ML), K(MH) and the atmospheric pressure data PO read in the step 100. More specifically, since the above-mentioned two maps ML and MH are provided exclusively for the low pressure PL and the high pressure PH respectively, the difference between the correction factors K(ML) and K(MH) corresponding to identical engine speed data NE and identical intake pressure data PM is totally caused from the difference between pressure. In order to compensate for the difference caused from pressure difference therefore, the value of the correction factor K1 is computed using actual atmospheric pressure data PO, the low pressure PL and the high pressure PH of the two maps ML and MH as well as the correction factors K(ML) and K(MH) derived from these maps ML and MH. This computation of the correction factor K1 is also performed through interpolation.

The correction factor K1 obtained in this way will be used for computing actual fuel injection duration Tp2 in a step 160. In detail, the basic fuel injection duration Tp1 is multiplied by the correction factor K1 to obtain the actual or final fuel injection duration data Tp2 in this embodiment.

The above-described steps 130 through 160 are executed when it is determined that conditions for EGR are satisfied in the step 120. In the case that the conditions for the performance of EGR are not fulfilled, steps 170 through 190 are executed in place of the step 130 through 160. In the step 170, a signal is fed from the microcomputer 52 to the drive circuit 58 so as to actuate the electromagnetic valve 26 to interrupt EGR operation. As a result, atmospheric pressure is led into the conduit 22A to lower the control valve head 22d against the force of the cylindrical spring to close the control valve 22 thereby interrupting recirculation of exhaust gasses. In a subsequent step 180, another correction factor K2 is searched in accordance with output data PO from the atmospheric pressure sensor 42. This correction factor K2 is also used for correcting the basic fuel injection duration Tp1. However, it is to be noted that this correction factor K2 is used only when EGR is not performed, whereas the aforementioned correction factor K1 is used only when EGR is performed. The reason why the correction factor K2 is obtained using atmospheric pressure PO is as follows. Since the performance of EGR is interrupted when this step 180 is executed, all the intake gas sucked into the engine 10 is fresh air, and therefore, the amount of intake air is simply affected by the variation of the atmospheric pressure, i.e. back pressure. Therefore, the correction factor K2 may be derived by a look-up table or map prepared in advance. More specifically, the concentration of air and therefore oxygen of the intake air sucked into engine cylinders when EGR is not being effected varies depending on the variation of atmospheric pressure in the inlet portion of the intake passage, and therefore, the amount of fuel to be supplied to the engine 10 should be corrected so as to compensate for the variation in air or oxgen concentration. To this end the second correction factor K2, used for correcting fuel injection duration, is used where a plurality of values of the second correction factors K2 are provided in advance in correspondence with various values of atmospheric pressure PO in the form of a map.

If desired however, simple calculation may be executed to obtain the second correction factor using a simple linear function instead of using such a map or look-up table.

In this way the second correction factor K2 is obtained which is used in a following step 190 to correct the basic fuel injection duration Tp1 thereby obtaining a corrected fuel injection duration Tp2. This corrected fuel injection duration Tp2 is stored in the memory as an actual fuel injection duration data.

A step 200 following either the step 190 or the step 160 is provided for setting the actual fuel injection duration Tp2 obtained in either of the steps 160 or 190 into an output counter (not shown). As a result, the drive circuit 56 is actuated for a duration determined by the actual fuel injection duration Tp2 so as to open the fuel injection valve 32 for this duration to supply fuel into the engine 10.

As described in the above, in the air/fuel ratio control apparatus according to the present invention, the air/fuel ratio is accurately controlled such that deviation of the air/fuel ratio from a desired value during the performance of EGR is corrected in connection with the rotational speed NE, the intake pressure PM and the atmospheric pressure PO, which are all the factors for causing the diviation. It is to be noted that accurate air/fuel ratio control can be achieved even though the amount of fresh air taken into engine cylinders is not directly measured while the invention can be adapted to so called speed-density system. As the air/fuel ratio is accurately controlled during EGR operation and also after the interruption of EGR, the engine 10 can be operated under the best operating condition.

In the above-described embodiment, although two of the two-dimentional maps, i.e. the low pressure map ML and the high pressure map MH, are used so that accurate control can be provided with less memory capacity, the number of such maps may be increased. The increase of the number of such maps provides further linear approximation in interpolation which results in further improvement in air/fuel ratio control though it requires a larger memory capacity. As a result, calculation for interpolation is simplified and thus processing speed is bettered.

As shown in FIG. 1, the above-described embodiment utilizes the atmospheric pressure sensor 42 which is provided independent of the intake pressure sensor 30. However, this atmospheric pressure sensor 42 may be removed if the intake pressure sensor 30 is used to detect atmospheric pressure immediately after the ignition key is turned on since the intake pressure sensed by the intake pressure sensor 30 is substantially equal to atmospheric pressure at the very beginning of engine rotation.

From the foregoing it will be understood that the present invention provides useful apparatus for correcting air/fuel ratio irrespective of the change in atmospheric air pressure since fuel injection amount is accurately and precisely corrected using detected engine rotational speed NE, intake pressure PM and atmospheric pressure PO. As a result, undesirable deviation of air/fuel ratio caused from the change in atmospheric pressure is effectively prevented. Therefore, when a motor vehicle having the engine system according to the present invention is driven at various places of different altitudes, the difference in altitude does not cause the change in air/fuel ratio thereby ensuring desired air/fuel ratio preventing emission of noxious comonents and providing desired engine output.

The above-described embodiment is just an example of the present invention, and therefore, it will be apparent for those skilled in the art that many modifications and variations may be made without departing from the scope of the present invention.

What is claimed is:

1. Apparatus for controlling air-fuel ratio of an air-fuel mixture to be supplied to an internal combustion engine having an intake passage, an exhaust passage, and an exhaust gas recirculation passage for recirculating exhaust gasses in said exhaust passage to said intake passage therethrough, said apparatus comprising:
   (a) means for sensing rotational speed of said engine;
   (b) means for sensing intake pressure in said intake passage;
   (c) means for sensing atmospheric pressure;
   (d) means for enabling and disabling exhaust gas recirculation through said exhaust gas recirculation passage in accordance with operating condition of said engine;
   (e) means for determining required amount of fuel in accordance with said sensed rotational speed and said sensed intake pressure;
   (f) means for determining, when the exhaust gas recirculation is enabled, a first correction value in accordance with said sensed rotational speed, said sensed intake pressure and said sensed atmospheric pressure, said first correction factor being used for correcting fuel amount so as to compensate for the decrease of fuel due to the performance of exhaust gas recirculation and also to compensate for the change in atmospheric pressure;
   (g) means for determining, when the exhaust gas recirculation is disabled, a second correction value in accordance with said atmospheric pressure, said second correction factor being used so as to compensate for the change in atmospheric pressure;
   (h) means for correcting said required amount of fuel by said first correction value and said second correction value when the exhaust gas recirculation is enabled and disabled respectively; and
   (i) means for supplying said engine with said corrected amount of fuel.

2. Apparatus as claimed in claim 1, wherein said first correction value determining means comprises:
   (a) memory means for providing, with respect to a predetermined high atmospheric pressure, a third value variable in accordance with said sensed rotational speed and said intake pressure;
   (b) memory means for providing, with respect to a predetermined low atmospheric pressure, a fourth value variable in accordance with said sensed rotational speed and said intake pressure; and (c) means for proportionally interpolating said third value and said fourth value in accordance with said sensed atmospheric pressure to determine said first correction value.

3. Apparatus as claimed in claim 1, wherein said second correction value determining means comprises means for selecting, in accordance with said atmospheric pressure, one correction value from a plurality of values arranged in correspondence with various values of atmospheric pressure.

4. Apparatus as claimed in claim 1, wherein said fuel amount correcting means comprises a processor for correcting a basic fuel injection duration by multiplying either of said first or second correction value.

5. Apparatus as claimed in claim 1, wherein said atmospheric pressure sensor is arranged to sense pressure in said intake passage.

6. Apparatus as claimed in claim 1, wherein said fuel supply means comprises a fuel injection valve through which fuel is injected into engine cylinders, said fuel injection valve being energized for a duration which is corrected by either of said first and second correction value.

* * * * *